Patented Aug. 1, 1933

1,920,494

UNITED STATES PATENT OFFICE 1,920,494

MANUFACTURE OF COUMARIN

Edgar C. Britton and William Robert Reed, Midland, Mich., assignors to The Dow Chemical Company, Midland, Mich., a Corporation of Michigan No Drawing. Application December 10, 1928
Serial No. 325,120

9 Claims. (Cl. 260—54)

The present invention relates to methods for the preparation of coumarin and an object thereof is to provide a suitably improved procedure whereby materially higher yields are attained than according to the usual methods as at present employed.

A well-known method for making coumarin starts with ortho-cresol. Such ortho-cresol is dissolved in aqueous caustic soda solution and treated with phosgene, $COCl_2$, to form ortho-cresol carbonate, which is then separated and purified. Such carbonate is then chlorinated in the presence of a small amount of phosphorus trichloride until sufficient chlorine has been absorbed to replace 2H atoms in the $CH_3$ group, whereby dichlor-ortho-cresol carbonate is formed. The latter compound is heated to fusion with anhydrous sodium or potassium acetate and acetic anhydride for several hours at a temperature between 150° and 190° C. The reaction mass is then distilled in vacuo directly from the reactor, and the distillate thereupon fractionally distilled to separate the reaction products consisting chiefly of acetic acid, acetic anhydride, salicylaldehyde, salicylaldehyde diacetate and coumarin. The yield of coumarin obtained according to the procedure just described falls far short of the theoretical, in our experience amounting at most only to about 50 per cent., and often being materially lower. We have now discovered certain improvements in the foregoing procedure whereby greatly increased yields may be attained.

To the accomplishment of the foregoing and related ends, the invention then consists of the steps hereinafter fully described and particularly pointed out in the claims, the following description setting forth but a few of the ways in which the principle of the invention may be used.

We have found that a materially higher yield is realized when the method just described is modified as follows: (1) the fusion step is carried out with addition of about 2 to 3 per cent of an anhydrous metallic chloride as catalyst; (2) acetic anhydride is not added initially to the fusion batch along with the dichlor-ortho-cresol carbonate and alkali acetate but is introduced preferably after reaction between the two last-named compounds has largely ceased, as is noted by a recession of the temperature of the reaction mass; (3) salicylaldehyde, which may be recovered in the products of a previous run, is included as a further addition to the reacting ingredients.

Various anhydrous metallic chlorides may be used as catalyst, such as cobalt chloride, ferric chloride, aluminum chloride and the like, but in general we prefer cobalt chloride. The effect of the catalyst is apparently to facilitate the progress of the first stage of the reaction as shown in equation (1) below.

The function of the acetic anhydride and salicylaldehyde may be explained by reference to the following graphical representation of the course of the reaction. When a mixture of dichlor-ortho-cresol carbonate and anhydrous sodium, potassium or calcium acetate, or other acetate of an alkali forming metal, is heated to incipient fusion, a reaction commences when the temperature has been raised to about 150° C., so that considerable heat is evolved and the temperature of the semi-fluid mass rises spontaneously to about 190° C., without further application of external heat. The reaction at this stage is represented by equation (1), the intermediate product formed being salicylaldehyde-diacetate-carbonate:

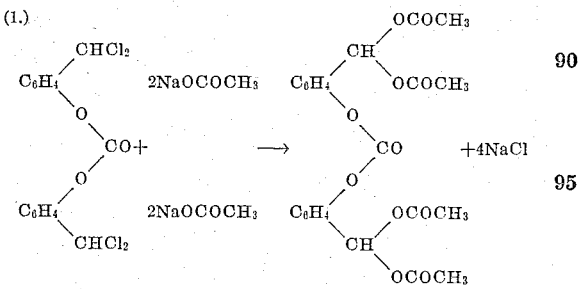

When the initial reaction is complete the aforesaid diacetate upon further heating and eventual distillation may break down in two different ways, yielding either coumarin or salicylaldehyde, both compounds being commonly found in the reaction product. The course of the reaction for the formation of coumarin is represented in the group of equations (2), and of salicylaldehyde in the group of equations (3).

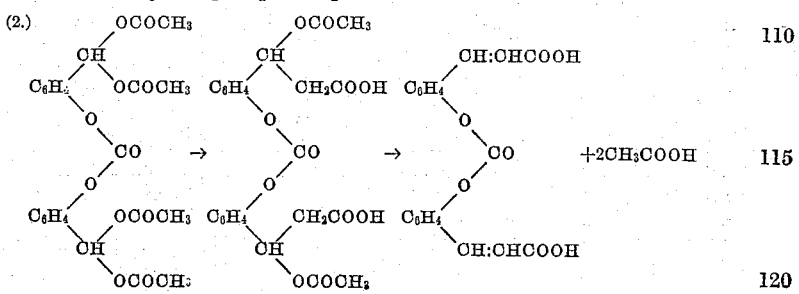

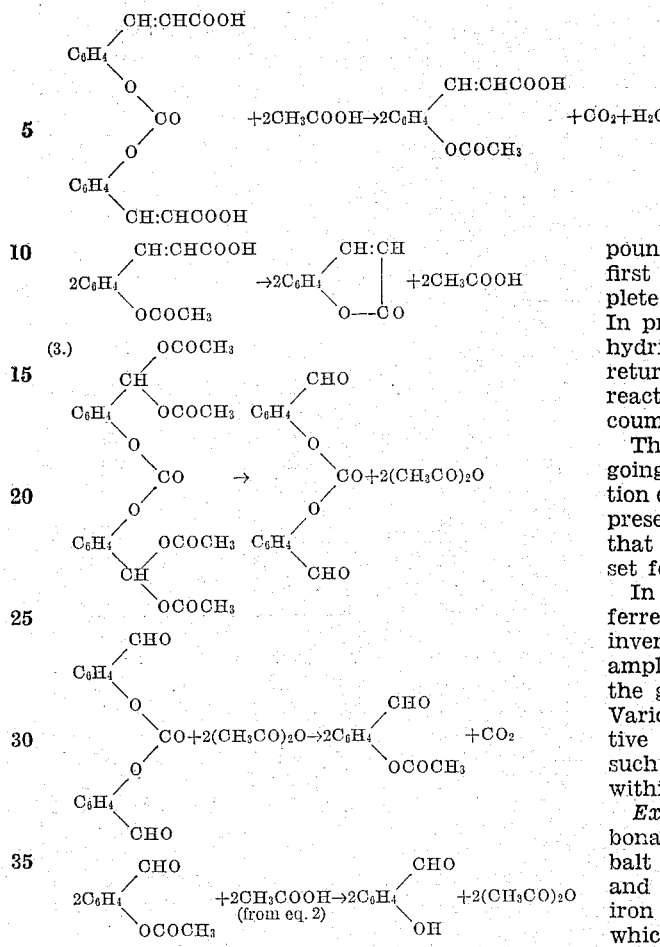

Acetyl-salicylaldehyde, formed as an intermediate product in equation (3), may also to a certain extent undergo rearrangement resulting in the closure of the secondary pyrone ring and formation of an enol form of compound, which in turn is dehydrated by action of acetic anhydride present to yield coumarin as shown in the group of equations (4):

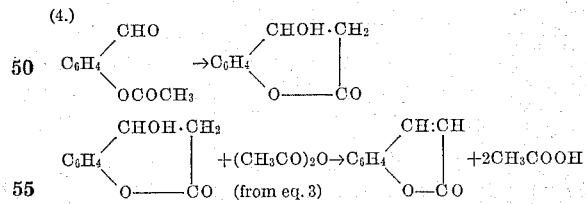

It will be seen that the final products derived as shown by equations (2) and (4) are coumarin and acetic acid, while those derived as in equation (3) are salicylaldehyde and acetic anhydride. In order to repress the reaction indicated by equation (3) salicylaldehyde and acetic anhydride are accordingly added to the reaction mixture, thereby maintaining a sufficient concentration of such compounds to prevent any substantial formation thereof at the expense of the primary reaction components. Salicylaldehyde may be included with the initial charge of materials for the reaction, since it has a sufficiently high boiling point (196.5° C.) that no material loss thereof by evaporation occurs at the reaction temperature, although it may be added at a later stage if so desired. On the other hand, the lower boiling point of acetic anhydride (139.5° C.) makes it advisable to add the latter compound to the reacting ingredients only after the first stage of the reaction is substantially complete so as to avoid loss thereof by evaporation. In practice such salicylaldehyde and acetic anhydride will be most advantageously supplied by returning the residual distillate from a previous reaction after having separated acetic acid and coumarin therefrom.

The theoretical discussion given in the foregoing is believed to afford an accurate description of the course of the reactions involved in the present method. However, it will be understood that our invention is not limited by any theory set forth in explanation of the facts presented.

In the following detailed example, one preferred mode of procedure for carrying out our invention is described, but such illustrative example is not to be construed as a limitation upon the general character of the method disclosed. Various modifications thereof involving operative details will occur to those versed in the art, such modifications being equally comprehended within the scope of our invention.

*Example.*—95 grams dichlor-ortho-cresol carbonate were mixed with 3 grams anhydrous cobalt chloride, 125 grams fused potassium acetate and 16.2 grams salicylaldehyde in an enclosed iron reaction vessel provided with an agitator which scraped the walls of the vessel and was strongly constructed so as to withstand the strain of stirring a semi-solid fusion mass. The mixture was heated rapidly with constant stirring to 100° C., and then more slowly while the temperature was gradually increased to about 150° C., whereat the reaction commenced. Sufficient heat was evolved to raise the temperature of the mass to about 190° to 200° C. When the initial reaction had largely subsided, and the temperature had fallen to about 165° C., 57 grams acetic anhydride were slowly added and heating continued until the total reacting time was approximately 5 hours. The reaction mass was then distilled under high vacuum directly from the reaction vessel, the temperature being gradually increased to about 190° C., whereby the volatile reaction products were separated from the non-volatile residue. The distillate was thereupon subjected to fractional distillation in vacuum, whereby acetic acid, acetic anhydride, salicylaldehyde and a small amount of salicylaldehyde acetate were first recovered, and finally the coumarin distilled over. The product was 52.3 grams coumarin, corresponding to 71 per cent. yield based upon the dichlor-ortho-cresol carbonate.

The distillate containing acetic acid, acetic anhydride, salicylaldehyde and a small amount of salicylaldehyde diacetate may be redistilled for the separation, first, of acetic acid therefrom. The residual mixture may then be fractionally distilled for the separation of remaining constituents, if desired, but for practical operation such mixture, without separation of the individual compounds, may be advantageously added to a succeeding reaction for supplying the acetic anhydride and salicylaldehyde thereto.

The object of converting ortho-cresol into the carbonate is to reduce the activation of ring H atoms by the OH group and thereby to prevent or avoid any material formation of ring-chlorinated compounds. Although we have, in the foregoing description, employed the carbonate, we may likewise make use of the corresponding phosphate, oxalate, benzoate or other ester of an inorganic or organic acid. The carbonate has the advantage that the acid radical is eliminated as $CO_2$, and a like advantage holds for the oxalate, whereas the phosphate radical, for instance, remains in combination in the reaction mixture and further reacts with alkali acetate to form alkali phosphate, thus causing a larger consumption of anhydrous alkali acetate. Our invention, accordingly, is not limited in its application to working with ortho-cresol carbonate, but is equally applicable to the utilization of any equivalent ester of ortho-cresol.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making coumarin, the step which consists in reacting an ester of dichlor-ortho-cresol with an anhydrous acetate of an alkali-forming metal in the presence of a catalyst selected from the group consisting of the anhydrous chlorides of the metals aluminum, iron and cobalt.

2. In a method of making coumarin, the step which consists in reacting dichlor-ortho-cresol carbonate with an anhydrous acetate of an alkali-forming metal in the presence of a catalyst selected from the group consisting of the anhydrous chlorides of the metals aluminum, iron and cobalt.

3. In a method of making coumarin, the step which consists in reacting dichlor-ortho-cresol carbonate with an anhydrous acetate of an alkali-forming metal in the presence of anhydrous cobalt chloride as catalyst.

4. The method of making coumarin which comprises reacting an ester of dichlor-ortho-cresol with an anhydrous acetate of an alkali-forming metal, acetic anhydride and salicylaldehyde being included with the reacting ingredients, whereby the formation of such two last-named compounds from the primary reacting materials is repressed.

5. The method of making coumarin which comprises reacting dichlor-ortho-cresol carbonate with an anhydrous acetate of an alkali-forming metal, acetic anhydride and salicylaldehyde being included with the reacting ingredients, whereby the formation of such two last-named compounds from the primary reacting materials is repressed.

6. The method of making coumarin which comprises reacting dichlor-ortho-cresol carbonate with an anhydrous acetate of an alkali-forming metal, acetic anhydride and salicylaldehyde being included with the reacting ingredients, whereby the formation of such two compounds from the primary reacting materials is repressed, distilling off volatile reaction products, separating coumarin and acetic acid therefrom, and adding the balance of said distillate containing acetic anhydride and salicylaldehyde to a succeeding reaction to supply said compounds therein.

7. The method of making coumarin which comprises reacting dichlor-ortho-cresol carbonate with anhydrous potassium acetate at a temperature between 150° and 200° C. in the presence of anhydrous cobalt chloride as catalyst, acetic anhydride and salicylaldehyde being included with the reacting ingredients, distilling off volatile reaction products, separating coumarin and acetic acid therefrom, and adding the balance of said distillate containing acetic anhydride and salicylaldehyde to a succeeding reaction to supply said compounds therein.

8. The method of making coumarin which comprises reacting dichlor-ortho-cresol carbonate with anhydrous potassium acetate at a temperature between 150° and 200° C. in the presence of anhydrous cobalt chloride as catalyst, acetic anhydride and salicylaldehyde being included with the reacting ingredients, distilling off the volatile reaction products and separating coumarin therefrom.

9. The method of making coumarin which comprises reacting dichlor-ortho-cresol carbonate with an anhydrous alkali-metal acetate at a temperature between about 150° and about 200° C. in the presence of a catalyst selected from the group consisting of the anhydrous chlorides of aluminum, iron and cobalt, acetic anhydride and salicylaldehyde being added to the reaction mixture, distilling off the volatile products formed, and separating coumarin therefrom.

EDGAR C. BRITTON.
WILLIAM ROBERT REED.